(12) United States Patent
Ouyang et al.

(10) Patent No.: US 11,202,334 B2
(45) Date of Patent: Dec. 14, 2021

(54) DETECTING CONDITIONS TO TRIGGER ROLE SWITCH

(71) Applicant: Google LLC, Mountain View, CA (US)

(72) Inventors: Xuemei Ouyang, Mountain View, CA (US); Jeffrey Kuramoto, Mountain View, CA (US); Shijing Xian, Sunnyvale, CA (US); Smriti Narang, Mountain View, CA (US); Jiang Zhu, Cupertino, CA (US); Daniel Barros, Redwood City, CA (US); Guang Xie, San Jose, CA (US)

(73) Assignee: Google LLC, Mountain View, CA (US)

( * ) Notice: Subject to any disclaimer, the term of this patent is extended or adjusted under 35 U.S.C. 154(b) by 86 days.

(21) Appl. No.: 16/670,004

(22) Filed: Oct. 31, 2019

(65) Prior Publication Data

US 2020/0196372 A1    Jun. 18, 2020

Related U.S. Application Data

(60) Provisional application No. 62/778,398, filed on Dec. 12, 2018.

(51) Int. Cl.
*H04R 5/04* (2006.01)
*H04W 72/04* (2009.01)
(Continued)

(52) U.S. Cl.
CPC ............ *H04W 76/25* (2018.02); *H04L 65/60* (2013.01); *H04L 65/80* (2013.01); *H04R 5/033* (2013.01); *H04R 5/04* (2013.01); *H04W 72/0406* (2013.01); *H04W 84/20* (2013.01); *H04R 2420/07* (2013.01)

(58) Field of Classification Search
CPC ...... H04W 4/80; H04R 1/104; H04L 61/6081; H02J 7/00032; H02J 7/0049
See application file for complete search history.

(56) References Cited

U.S. PATENT DOCUMENTS

| 9,924,010 B2 | 3/2018 | Watson et al. |
| 2016/0219358 A1 | 7/2016 | Shaffer et al. |

(Continued)

FOREIGN PATENT DOCUMENTS

CN    108419228 A    8/2018

OTHER PUBLICATIONS

International Search Report and Written Opinion for International Application No. PCT/US2019/059153 dated Mar. 24, 2020. 24 pages.

(Continued)

*Primary Examiner* — Iqbal Zaidi
(74) *Attorney, Agent, or Firm* — Lerner, David, Littenberg, Krumholz & Mentlik, LLP (57) ABSTRACT

The present disclosure provides for detection of conditions, and triggering role switch between wirelessly paired devices in response to detection of particular conditions. In response to detection of particular conditions, a primary device may switch roles with a secondary device. Such conditions may include battery level of each device, signal strength of each device, audio buffer levels, whether the devices are being worn by a user, whether a microphone is active, historic data, or any combination of these or other conditions.

20 Claims, 9 Drawing Sheets

(51) Int. Cl.
  *H04W 84/20*  (2009.01)
  *H04W 76/25*  (2018.01)
  *H04L 29/06*  (2006.01)
  *H04R 5/033*  (2006.01)

(56) References Cited

U.S. PATENT DOCUMENTS

| | | |
|---|---|---|
| 2017/0041252 A1* | 2/2017 | Das ............... H04L 65/403 |
| 2017/0094389 A1 | 3/2017 | Saulsbury et al. |
| 2017/0234962 A1 | 8/2017 | Yang et al. |
| 2017/0264987 A1 | 9/2017 | Hong et al. |
| 2017/0311105 A1 | 10/2017 | Hariharan et al. |
| 2018/0084456 A1 | 3/2018 | Gostev et al. |
| 2018/0184234 A1* | 6/2018 | Chen ............... H04W 76/14 |
| 2020/0107262 A1* | 4/2020 | Shaw ............... H04W 4/80 |

OTHER PUBLICATIONS

Invitation to Pay Additional Fees for International Application No. PCT/US2019/059153 dated Jan. 30, 2020. 27 pages.

International Preliminary Report on Patentability for International Application No. PCT/US2019/059153 dated Jun. 24, 2021. 15 pages.

* cited by examiner

DETECTING CONDITIONS TO TRIGGER ROLE SWITCH

CROSS-REFERENCE TO RELATED APPLICATIONS

The present application claims the benefit of the filing date of U.S. Provisional Patent Application No. 62/778,398 filed Dec. 12, 2018, the disclosure of which is hereby incorporated herein by reference.

BACKGROUND

Some wireless audio accessories, such as wireless earbuds, may have a primary device that is coupled to a mobile phone or other mobile computing device, and a secondary device that is coupled to the primary device. Accordingly, for example, the phone sends audio to the primary earbud and the primary earbud relays the audio to the secondary earbud. The two earbuds can swap roles, such that the secondary earbud becomes primary and connects to the phone and the primary earbud becomes secondary and receives relayed audio.

In this architecture, there are three possible connections: 1) phone to primary device; 2) primary device to secondary device; 3) phone to secondary device. If the phone to primary device has a poor connection but the other two connections are strong, as it could be if three devices are arranged in a line, it may be desirable to swap the roles of the two device to avoid audio glitching. However, there is currently no way to evaluate the quality of the potential connection between the secondary device and the phone. Bluetooth has no standard way of evaluating connection quality without creating an actual connection or broadcasting data from one device to another. Moreover, the act of creating the new connection uses a lot of power and can affect connection quality for the other connections.

BRIEF SUMMARY

One aspect of the disclosure provides a method for determining, by a primary device, whether to switch roles with a paired secondary device, the method including sending, by the primary device, connection parameters to the secondary device, the connection parameters providing information allowing for the secondary device to listen to communications between the primary device and a host, communicating, by the primary device, with the host device, the communicating including one or more transmissions of packets, determining, by one or more processors of the primary device, primary signal quality metrics for the one or more transmissions, receiving, from the secondary device, secondary signal quality metrics related to a possible connection between the secondary device and the host, and determining, based on the primary signal quality metrics and the secondary signal quality metrics, whether to switch roles with the secondary device.

Another aspect of the disclosure provides a method for determining, by a secondary device, whether to switch roles with a paired primary device, the method including receiving connection parameters for a connection between the primary device and a host, listening for communications between the primary device and the host using the received connection parameters, determining secondary signal quality metrics for a potential connection between the secondary device and the host based on the communications, receiving, from the primary device, primary signal quality measurements for a connection between the primary device and the host based on the communications, and determining, based on the secondary signal quality measurements and the primary signal quality measurements, whether to switch roles with the primary device.

Yet another aspect of the disclosure provides a system, including a first device adapted to operate in a primary role wherein it wirelessly couples to a host device, and a second device adapted to operate in a secondary role wherein it wirelessly couples with the first device and communicates with the host device through the first device. The first device is further adapted to communicate connection parameters for its connection with the host to the second device. The second device is further adapted to listen to communications between the first device and the host using the connection parameters, to determine signal quality metrics for a potential connection between the second device and the host device based on the communications, and to determine whether to switch roles with the first device based on at the least the determined signal quality metrics.

According to some examples, the out-of-band connection signal strength determinations may be used in other types of switching, such as in non-audio applications. By way of example only, in a mesh related network, a path between two or more devices may be compared to a potential path between two or more of the same or different devices. For example, a path from device A to B to C may be compared to a potential direct path between A and C. This method may be particularly useful in networks of power-limited devices.

DETAILED DESCRIPTION

The present disclosure provides for detection of conditions, and triggering role switch between wirelessly paired devices in response to detection of particular conditions. For example, in response to detection of particular conditions, a primary device serving as Bluetooth master may switch roles with a secondary device serving as Bluetooth slave. Examples of such conditions include battery level of each device, signal strength of each device, audio buffer levels, whether the devices are being worn by a user, whether a microphone is active, historic data, or any combination of these or other conditions.

According to some examples, the secondary device may be programmed with parameters to allow it to listen to transmissions between a host device, such as a mobile phone, and the primary device. The primary and secondary device communicate data, such as connection parameters for a connection between each device and the host, between themselves. The connection parameters are defined to allow the secondary device to listen to the phone. The secondary device programs in these parameters to allow it to see transmissions from the phone to the primary device. For each transmission it sees, it forwards signal quality metrics that can help evaluate the connection parameters for the phone. The primary device gathers similar metrics from its connection to the phone. The primary and secondary devices communicate to each other their respective connection strengths for their connections to the phone, and determine whether to switch roles.

The connection parameters allowing the secondary device to listen to the phone may include, for example, frequency hopping information, such as a Bluetooth media access control (MAC) address of the phone, Bluetooth clock of the phone, offset of the phone's Bluetooth clock to a clock used for the connection between the primary and secondary devices, frequency hopping channel map, scheduled time for next transmission, fixed frequency (for non-frequency hopping protocols), and potentially other parameters. According to some examples, the secondary device may receive additional parameters from the primary bud to guess when the phone is going to transmit data. For example, phones typically send audio data on particular intervals, such as a 10 ms, 20 ms, 50 ms, or other interval. Given the interval and offset where the phone is sending data, the secondary device can wake up at times near or almost exactly when the phone is going to transmit.

Examples of the signal quality metrics forwarded for each transmission seen by the secondary device may include raw signal strength (RSSI), average signal strength, and/or other metrics that can help evaluate the connection parameters for the phone. The secondary device may measure signal strength from the phone in any of a number of ways. For example, the secondary device may pretend it has an actual connection to the phone, such that it can listen to the packets transmitted by the phone, but not respond to those packets. As another example, for protocols that do not use frequency hopping, it would be possible to listen for RF noise, even if it cannot be decrypted or understood, and measure how strong the signal is. This may have a higher power cost than other options. According to another example, an interval may be programmed in the secondary device in which it wakes up to listen to the phone. According to some examples, the secondary device does not receive an entire packet, but rather only looks at a Bluetooth header, gets the signal strength, and disables reception to save power.

The metrics gathered by the primary device from its connection to the phone may include, for example, standard Bluetooth metrics. In some examples, the metrics may be augmented by non-standard features.

The communications between the primary and second devices regarding their connection strengths to the phone may be performed by an application code running on the primary and secondary devices. The application code may also be executed to decide whether the devices should swap roles. The decision may further be based on additional factors, such as a length of time needed to perform the swap, battery life of each device, or other conditions, such as if a finger is providing input to the device. The time needed for the switch is relevant to determine whether the swap could be performed fast enough to be seamless. The battery life of the devices is relevant because primary devices typically drain faster than secondary buds, so it may be preferable for the device with longer battery life to serve as the primary role. The finger providing input may also cause interference with signals received by the device, for example, by covering an antenna of the device while providing input. This may affect signal strength, and therefore it may be desirable to preemptively swap roles before measuring signal strength.

According to other examples, a determination whether or not to switch roles may be based on other conditions detected by one or both paired devices. For example, such conditions may include an activity status, such as whether the device is active or dormant, or whether a microphone of the device is actively receiving input or not. Other conditions may include a wear status, such as whether the device is being worn by a user or not. For example, it may be detected whether earbuds are in the user's ears, whether smart glasses are worn on the user's face, etc. Further example conditions include an audio buffer level of the device, battery life of the device, historic data, or any of a variety of other factors.

By determining when it is possible to switch roles as described herein, better audio quality may be provided. Moreover, the determination may be made in a way that conserves power and does not use too much battery life.

Example Systems

Figure 1A:
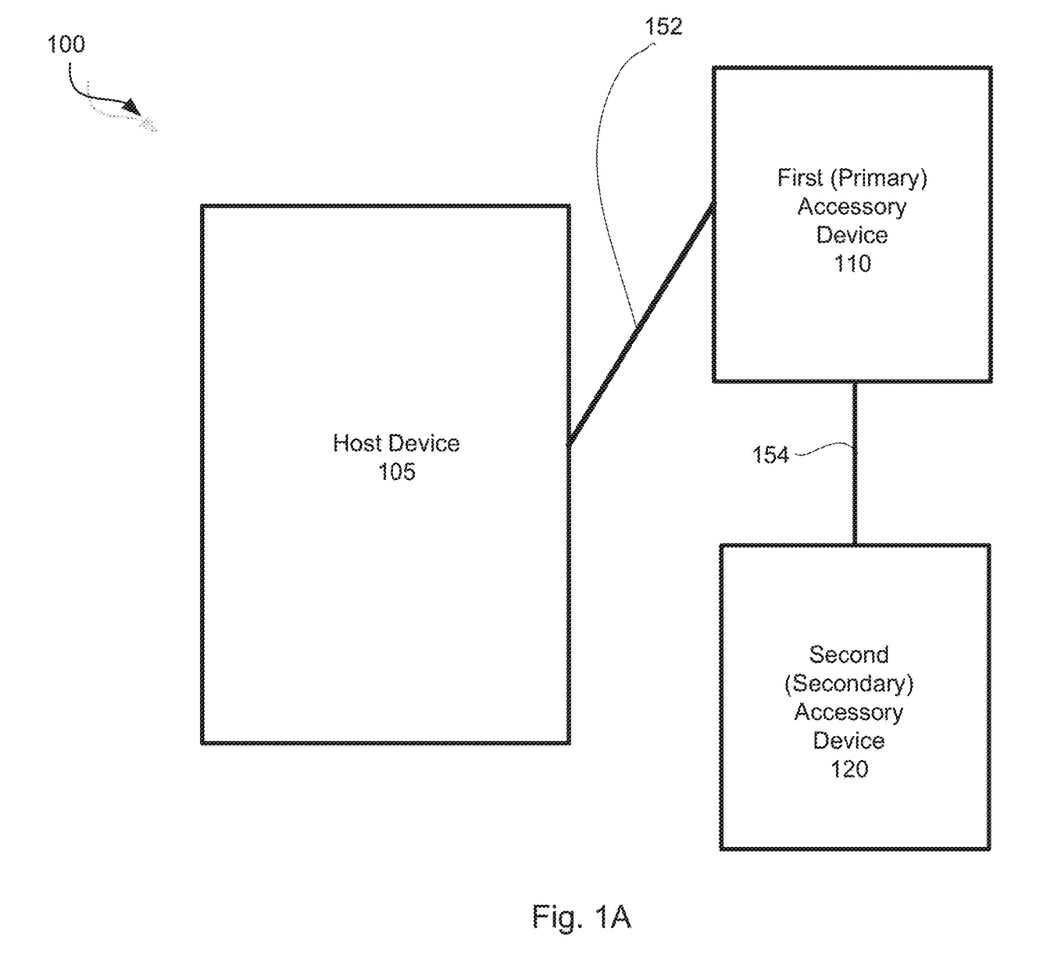
FIG. 1A is a block diagram illustrating an example system according to aspects of the disclosure.

FIG. 1A illustrates an example system 100 including a host device 105 communicatively coupled to first accessory device 110. The first accessory device 110 may be one of a pair of accessory devices, such as earbuds, wireless speakers, etc. The first device 110 may be operating in a primary role. As such, in addition to being coupled to the host device, the first device 110 is further communicatively coupled to second accessory device 120, which is operating in a secondary role.

The connection between the devices 105, 110, 120 may be, for example, short range wireless pairing, such as Bluetooth. For example, host device 105 may be coupled to first device 110 via a host communication link 152, such as a first asynchronous connection-less (ACL) link. The first device 110 may be coupled to the second device 120 via a relay communication link 154, such as second ACL link.

Figure 1B:
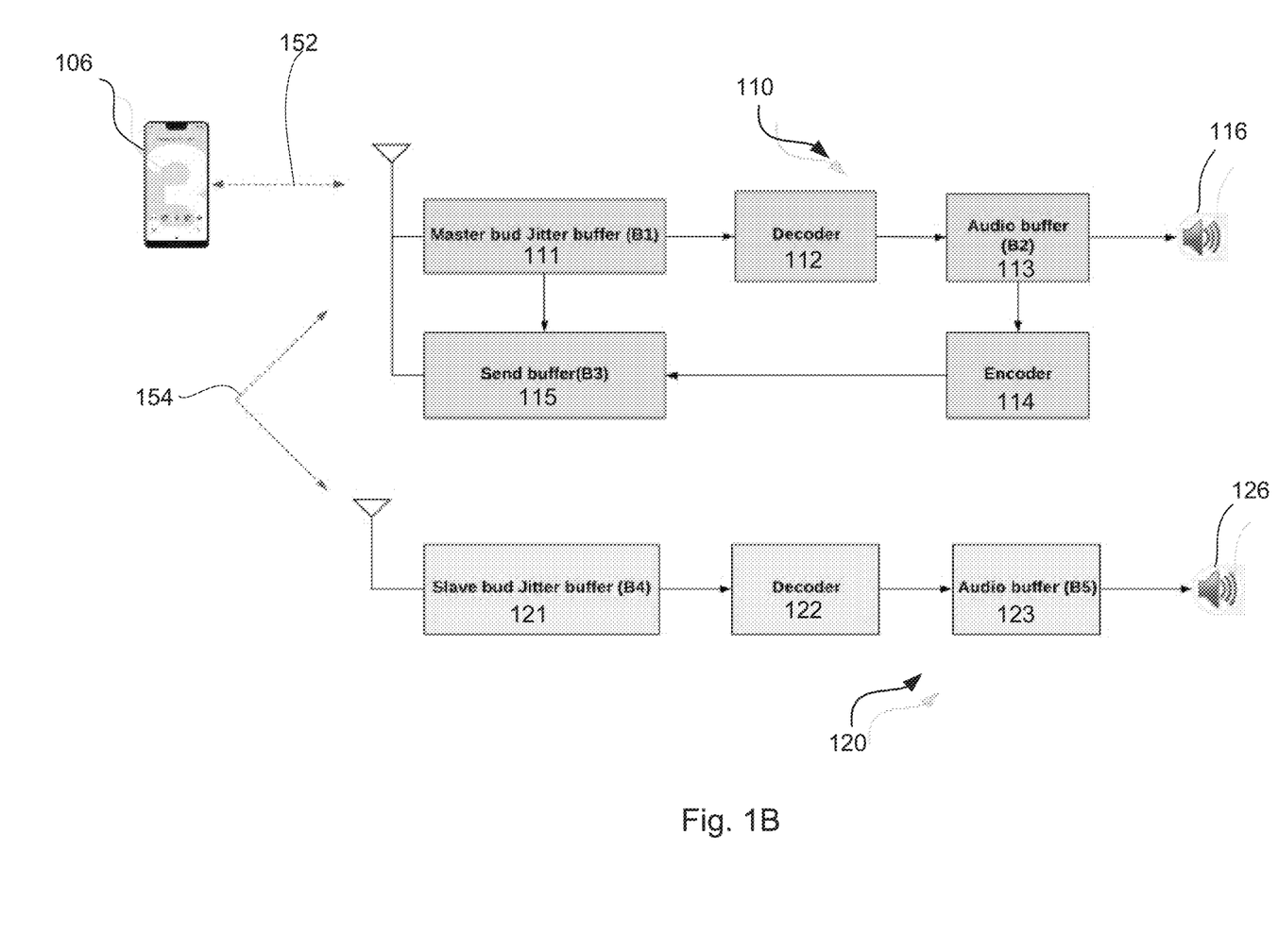
FIG. 1B is another block diagram illustrating the example system according to aspects of the disclosure.

FIG. 1B illustrates another example system, where host device is a mobile phone 106. As shown, the first device 110 includes a jitter buffer 111, decoder 112, audio buffer 113, encoder 114, send buffer 115, and speaker 116. The second device 120 may include the same components, though not all are shown and not all may be needed when the second device 120 is operating in secondary or slave mode.

Audio and/or data packets may be received at the first device 110 from the phone 106 over the host communication link 152. Audio packets may be buffered in jitter buffer 111, decoded by decoder 112, buffered in audio buffer 113, and output through speaker 116. Further, such packet may be relayed to the second device 120 for output. As such, the packets may be encoded by encoder 114, buffered in send buffer 115, and transmitted to the second device 120 over relay communication link 154. The second device 120 buffers the relayed packets in jitter buffer 121, decodes them with decoder 122, buffers in audio buffer 123, and outputs through speaker 126. The audio packets may be output as audio content through both speakers 116, 126 simultaneously or virtually simultaneously such that any delay is undetectable by a human ear.

Though not shown, the first and second devices may further include additional components, such as batteries, microphones, sensors for detecting conditions relative to the first and second devices, memories, etc. For example, each device may include sensors for detecting whether the device is being worn. Such sensors may include capacitive sensors, heat sensors, motion sensors, light sensors, accelerometers, or any other type of sensors. As another example, each device may include a memory storing historic information related to prior usage of the device. For example, the device may store information regarding typical days or times it is in use, a duration of time it is typically in use, signal strength, proximity to the host device, etc. Information from any of these other components, individually or in combination, may be used to determine whether to perform a role switch between the devices 110, 120.

Figure 2:
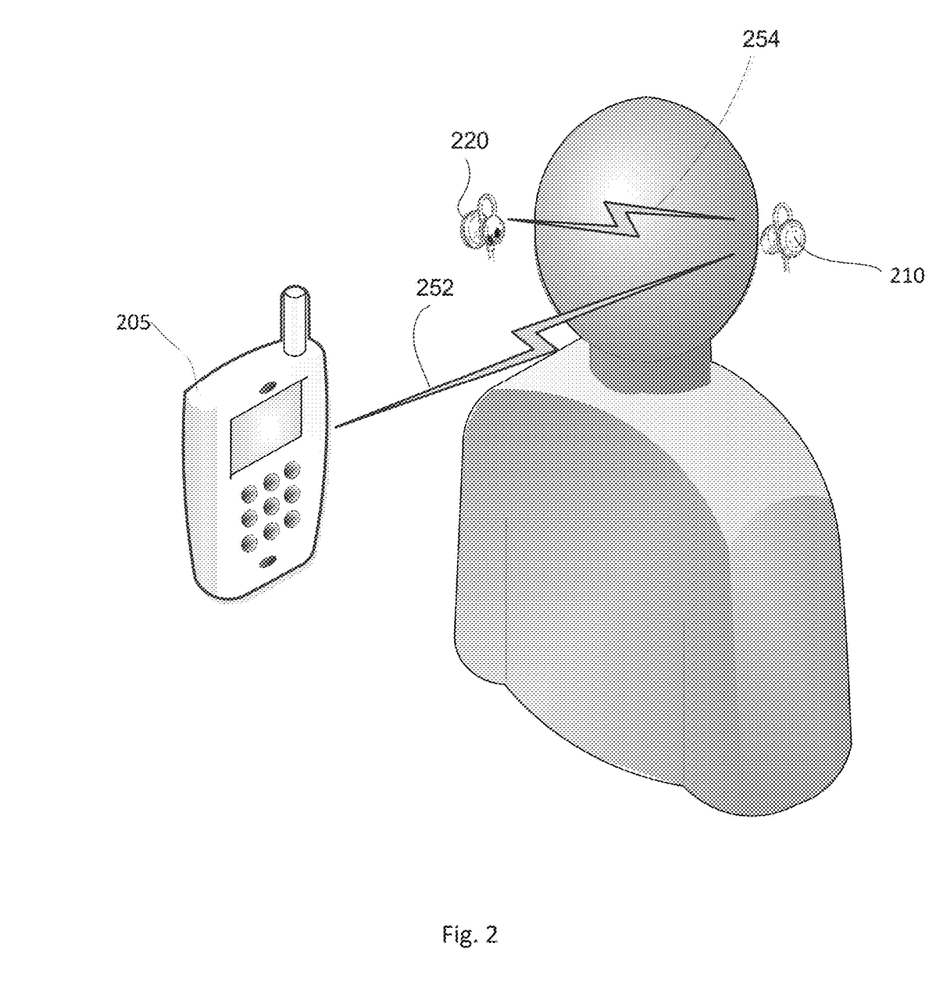
FIG. 2 is an example pictorial diagram of the system of FIGS. 1A-B.

FIG. 2 illustrates an example system, wherein the host device is a mobile phone 205, the first device operating in the primary role is a first earbud 210, and the second device operating in the secondary role is a second earbud 220. Host communication link 252 exists between the phone 205 and the first earbud 210, while relay communication link 254 exists between the first earbud 210 and the second earbud 220.

While the host device in this example is illustrated as a mobile phone, it should be understood that the host device may be any of various types of devices adapted to transmit audio signals. For example, the host device may be a tablet, smart watch, game system, music player, laptop, personal digital assistant device, or any other computing device. Similarly, the first and second accessories, while here shown as earbuds 210, 220, may in other examples be any combination of speakers or other audio devices, video output displays, etc. The first and second accessories may be paired during a time of manufacture, or may be sold separately and paired later by a user.

In some instances, it may be desirable for the first and second accessories to switch roles. For example, the earbud serving in the primary role may have a lower quality signal strength connection with the host as compared to a possible connection between the host and the device in the secondary role. In the arrangement of FIG. 2, the first earbud 210 is subject to cross-body interference with respect to the host device 105, because the host device 105 is being held on an opposite side of the user's body. The second earbud 220, in contrast, is on a same side of the user's body as the host device 105. Accordingly, the second earbud 220 is subject to less cross-body interference than the first earbud 210.

Figure 3:
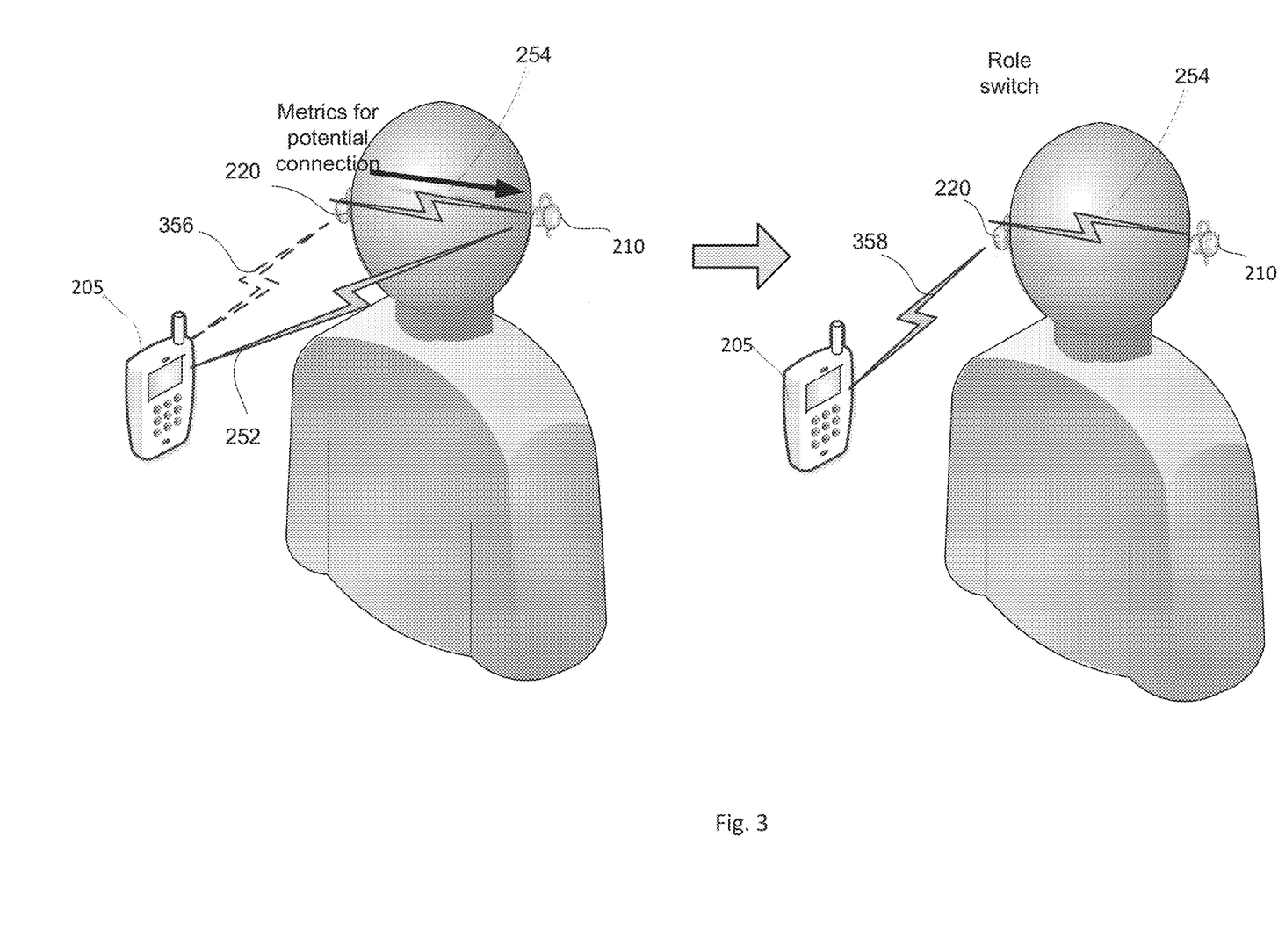
FIG. 3 is a pictorial diagram illustrating role switching according to aspects of the disclosure.

FIG. 3 illustrates an example of determining whether the secondary device may have a better connection and switching roles of the devices. In this example, the second earbud 220 operating in the secondary mode evaluates a potential connection 356 between the phone 205 and the second earbud 220. For example, the second earbud 220 listens in on transmissions between the phone 205 and the first earbud 210 over the host communication link 252. For each transmission, the second earbud 220 may determine signal quality metrics for the potential connection 356, and forward such metrics to the first earbud 210 over the relay link 254. Examples of such metrics may include instantaneous RSSI, average signal strength over a period of time, battery level, status of whether the device is being worn, etc. The first earbud 210 may similarly determine such metrics for its communications over the host link 252. The first earbud 210 may forward its determined metrics to the second earbud 220. Accordingly, the earbuds 210, 220 can negotiate whether to switch roles based on a comparison of the signal quality metrics. According to some examples, the decision whether to switch roles may be further based on other, such as battery levels of the first and second devices, etc. For example, the device serving in the master role may consume more power than the device serving in the slave role. Accordingly, when a battery of the master device drains to a predetermined level, for example, it may be desirable to switch roles with the slave device.

While in some examples the decision whether to swap roles may be made by both the first and second devices 210, 220, in other examples the decision may be made by only one or a subset of the devices. For example, the second earbud 220 may forward the signal quality metrics for the potential connection 356 to the first earbud 210, which compares it to its own metrics and decides whether to initiate a role switch. Alternatively, the first earbud 210 may forward its determined metrics to the second earbud 220, which performs the comparison and determines whether to initiate a role change.

As further shown in FIG. 3, the first and/or second earbuds 210, 220 decide to swap roles, such that the first device 210 is operating in the secondary mode while the second device 220 operates in the primary mode. As such, the second device 220 establishes a direct link 358 with the phone 205 over which it receives audio packets from the phone 205, and then forwards such packets to the first device 210 over the relay link 254.

In addition or in the alternative to detecting signal quality and performing role switch based on signal quality, the first device 210 and second device 220 may detect a variety of other information and use such information to determine whether to perform role switch. For example, the first and second devices may each detect remaining battery levels, whether the devices are being worn by the user, whether the device has the active microphone, whether its audio buffer levels exceed a predetermined threshold, etc.

Figure 4:
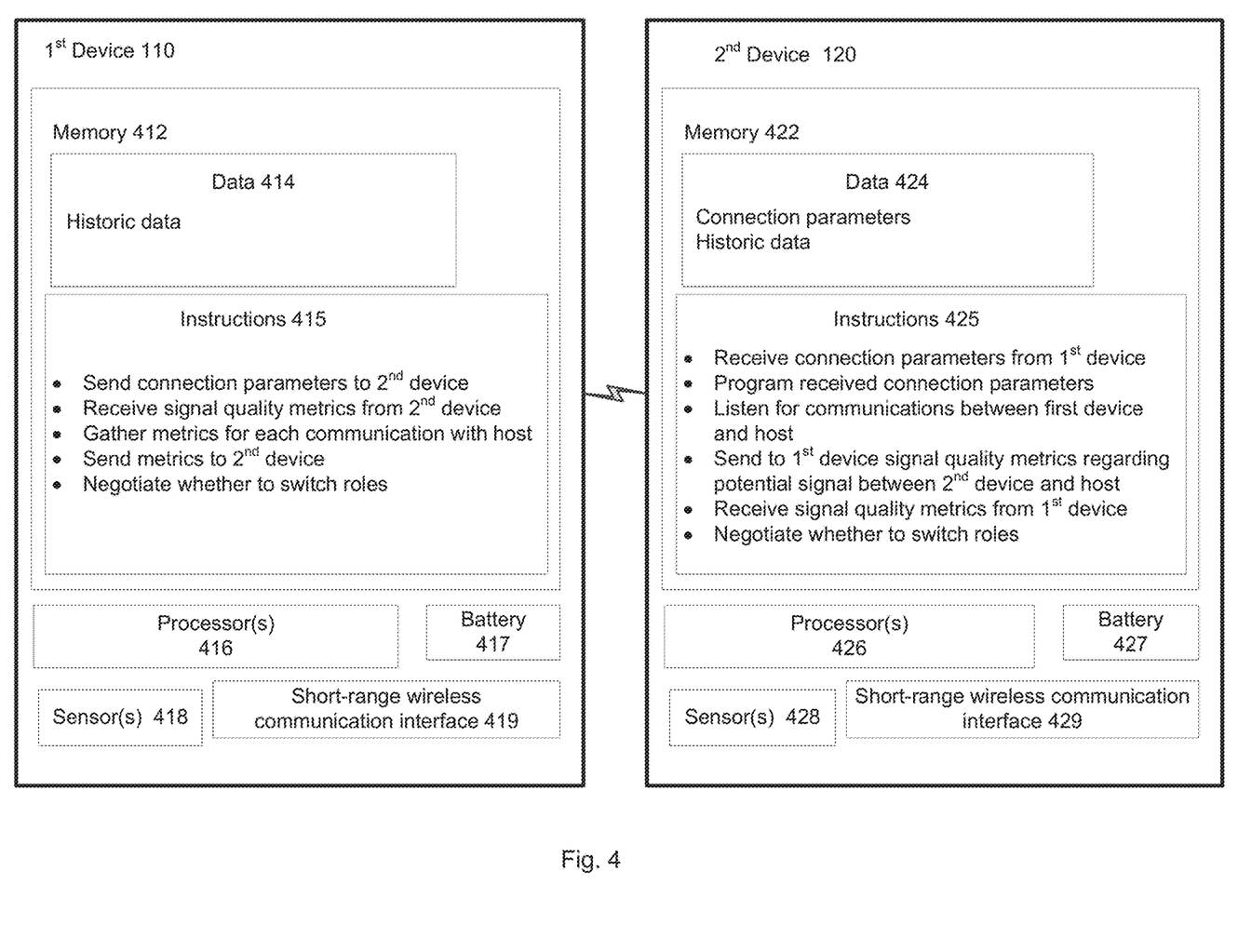
FIG. 4 is a functional block diagram illustrating an example system according to aspects of the disclosure.

FIG. 4 illustrates an example of internal components of the first device 110 and second device 120. While a number of internal components are shown, it should be understood that additional or fewer components may be included. By way of example only, the devices may include components typically found in playback devices, such as speakers, microphones, etc. The devices may be, for example, wireless accessories, such as earbuds, speakers, displays, etc. The devices are primarily described below with respect to the first device 110. While the second device 120 may be similar or identical to the first device 110 in some examples, in other examples the second device 120 may be a different type of device. Additionally or alternatively, the second device 120 may have different internal components.

The first device 110 may include one or more processors 416, one or more memories 412, as well as other components. For example, the computing device 110 may include one or more sensors 418, wireless pairing interface 419, and a battery 417.

The memory 412 may store information accessible by the one or more processors 416, including data 414 instructions 415 that may be executed or otherwise used by the one or more processors 416. For example, memory 412 may be of any type capable of storing information accessible by the processor(s), including a computing device-readable medium, or other medium that stores data that may be read with the aid of an electronic device, such as a volatile memory, non-volatile as well as other write-capable and read-only memories. By way of example only, memory 412 may be a static random-access memory (SRAM) configured to provide fast lookups. Systems and methods may include different combinations of the foregoing, whereby different portions of the instructions and data are stored on different types of media.

The data 414 may be retrieved, stored or modified by the one or more processors 416 in accordance with the instructions 415. For instance, data 414 may include short range wireless communication profiles, such as Bluetooth profiles. The data 414 may further include buffered packets, such as an audio buffer with packets received from a host device. Although the claimed subject matter is not limited by any particular data structure, the data may be stored in computing device registers, in a relational database as a table having a plurality of different fields and records, XML documents or flat files. The data may also be formatted in any computing device-readable format.

The instructions 415 may be any set of instructions to be executed directly (such as machine code) or indirectly (such as scripts) by the one or more processors 416. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The one or more processors 416 may be microprocessors, logic circuitry (e.g., logic gates, flip-flops, etc.) hard-wired into the device 110 itself, or may be a dedicated application specific integrated circuit (ASIC). It should be understood that the one or more processors 416 are not limited to hard-wired logic circuitry, but may also include any commercially available processing unit, or any hardware-based processors, such as a field programmable gate array (FPGA). In some examples, the one or more processors 416 may include a state machine. The processors 416 may be configured to execute the instruction 415 to, for example, perform a method such as described below in connection with FIG. 5.

The one or more sensors 418 may include any of a variety of mechanical or electromechanical sensors for detecting conditions relevant to a role switch. Such sensors may include, for example, an accelerometer, gyroscope, switch, light sensor, barometer, audio sensor (e.g., microphone), vibration sensor, heat sensor, radio frequency (RF) sensor, etc. In this regard, the device 110 may detect conditions indicating that the device should switch roles with its paired device. As one example, the sensors may detect received signal strength, and may compare the received signal strength to that of the paired device. The device 110 and its paired device may thus negotiate whether to switch roles. As another example, the sensors may detect other parameters, such as battery life, signal quality, movement, etc.

The short range wireless pairing interface 419 may be used to form connections with other devices, such as paired second device 120 or a host device, such as a mobile phone providing the audio packets. The connection may be, for example, a Bluetooth connection or any other type of wireless pairing. By way of example only, each connection may include an ACL link.

Although FIG. 4 functionally illustrates the processor, memory, and other elements of device 110 as being within the same block, it will be understood by those of ordinary skill in the art that the processor and memory may actually include multiple processors and memories that may or may not be stored within the same physical housing. For example, memory 412 may be a volatile memory or other type of memory located in a casing different from that of computing device 110. Moreover, the various components described above may be part of one or more electronic devices.

In this example, the second device 120 has an internal architecture similar to that of the device 110. For example, the second device 120 includes a memory 422 storing data 424 and instructions 425 which may be executed by one or more processors 426. The second device 120 further includes a battery 427, sensors 428, a communication interface 429, such as a Bluetooth interface, etc. While the second device 120 is shown as executing a different set of instructions 425 than the instructions 415 of the first device 110, it should be understood that both devices 110, 120 may be programmed to perform role switch from primary to secondary and from secondary to primary.

As mentioned above, the instructions 415 and 425 may be executed to determine whether the first and second devices should perform a role switch. For example, the instructions may be executed to determine whether a potential connection between a secondary device and a host would have better signal quality than an existing connection between a primary device and the host. In other examples, the instructions may be executed to determine whether the secondary device has higher battery levels, greater audio buffer availability, etc. Such determination may be performed prior to an actual role switch. In that regard, if the secondary device is determined not to be a better candidate for serving in the primary role based on signal quality and possibly other factors, role switch may not be performed. Rather, role switch may be reserved for situations in which the devices confirm that the switch will result in better signal conditions.

Example Methods

Figure 5:
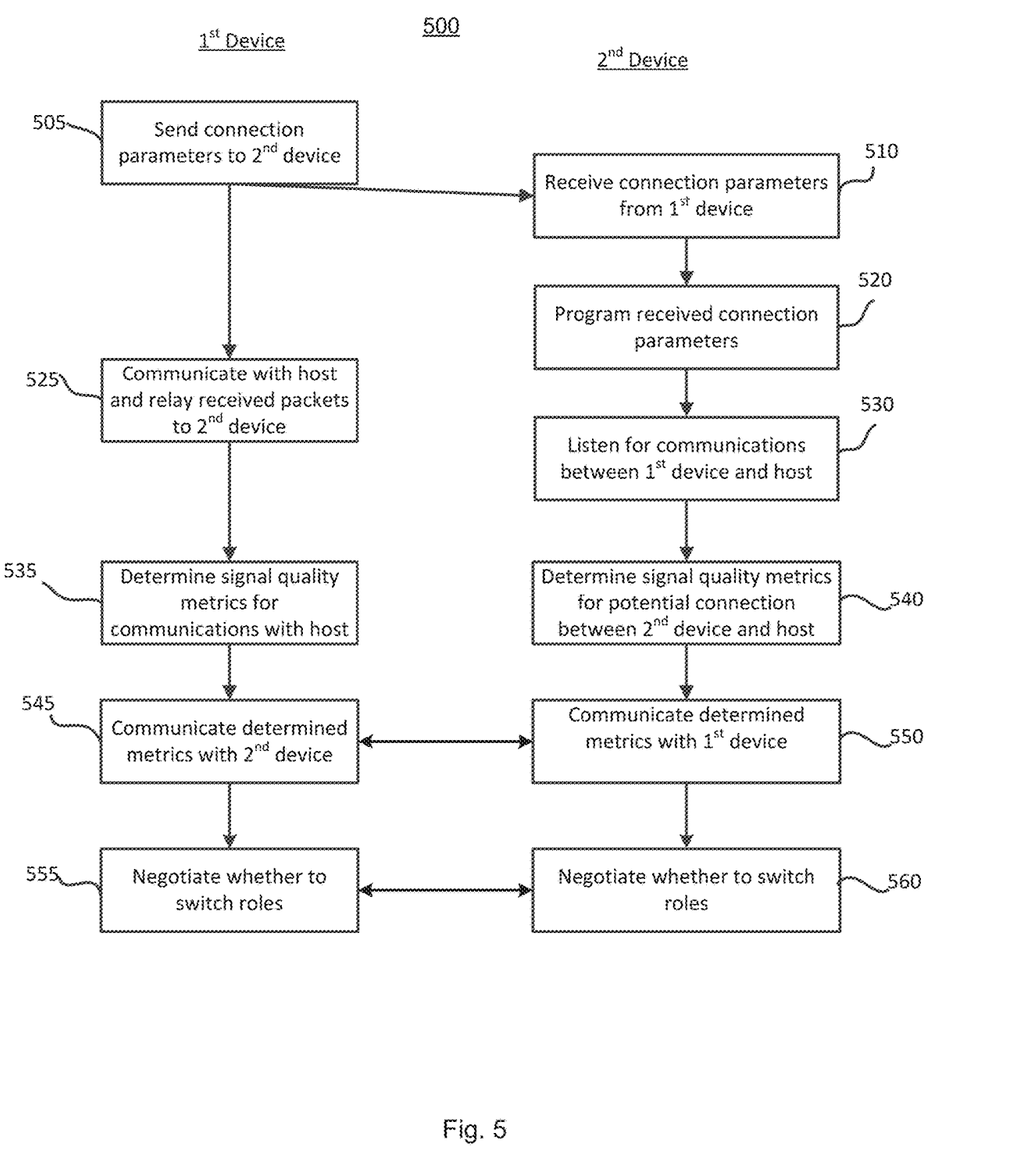
FIG. 5 is a flow diagram illustrating an example method according to aspects of the disclosure.

FIG. 5 is a flow diagram illustrating an example method 500 of determining whether a role switch should be performed between a first wireless accessory and a second wireless accessory. While the operations are illustrated and described in a particular order, it should be understood that the order may be modified and that operations may be added or omitted.

In block 505, the first device serving in the primary role sends its connection parameters to the second device serving in the secondary role. For example, the connection parameters may be sent over an existing ACL link between the first and second devices, wherein the ACL link is also used for relaying audio packets from the primary device to the secondary device. The connection parameters may include information allowing the secondary device to listen to the host device. For example, such connection parameters may include frequency hopping information, such as a Bluetooth media access control (MAC) address of the phone, Bluetooth clock of the phone, offset of the phone's Bluetooth clock to a clock used for the connection between the primary and secondary devices, frequency hopping channel map, and potentially other parameters.

In block 510, the second device receives the connection parameters from the first device. According to some examples, the secondary device may receive additional parameters from the primary device, such as parameters indicating when the host device is going to transmit data. For example, phones typically send audio data on particular intervals, such as a 20 ms interval. Given the interval and offset where the phone is sending data, the secondary device can wake up at a time close to or almost exactly when the phone is going to transmit.

In block 520, the second device programs the received connection parameters. For example, the second device configures its system using such parameters to allow it to listen to transmissions from the phone to the primary device.

As shown in block 525, the first device continues communication with the host. Packets received from the host, such as audio packets, video packets, or other types of packets, are relayed to the second device. In some examples, the first device may also transmit packets back to the host. For example, the first device may include a microphone that captures audio, such as voice input from a user. Such captured audio may be sent to the host device, for example, to a mobile phone for inputting a command, for transmission to another user in a phone call, or for any of a variety of other reasons.

In block 530, the second device listens to the communications between the first device and the host. For example, the second device receives packets sent on the communication line between the host and the first device using the connection parameters received from the first device. According to some examples, an interval may be programmed in the second device in which it wakes up to listen to the host.

For each transmission between the host and the first device that is observed by the second device, the second device determines signal quality metrics in block 540. The signal quality metrics measure quality of a potential link between the host and the second device. Examples of such metrics include, instantaneous RSSI, average signal strength, noise, error rate, etc. The second device may measure signal strength from the host in any of a number of ways. For example, the second device may pretend it has an actual connection to the host. This may have a higher power cost than other options. According to some examples, the secondary device does not receive an entire packet, but rather only looks at a Bluetooth header, gets the signal strength, and disables reception to save power. Other methods for measuring signal quality include identifying a packet drop rate, an amount of throughput that can be obtained on the potential link, packet re-transmit counts, etc. In block 535, the first device also computes similar signal quality metrics for its connection with the host. According to some examples, the secondary device may optionally unconfigure the connection parameters used to listen to the host device after measuring the signal quality.

In blocks 545, 550 the first and second devices exchange the determined metrics. For example, the first device may send its computed metrics to the second device. Alternatively or additionally, the second device may send its computed metrics to the first device. These transmissions may occur over the communication link between the first and second devices used to relay packets from the primary device to the secondary device, such as an ACL link. According to other examples, such information may be communicated over a sideband channel or another link.

In blocks 555, 560, the first and second devices negotiate whether to switch roles. For example, both devices may compare the signal strength metrics measured by the first and second devices. As another example, one of the first or second devices may do the comparison. In either example, one or both device may determine whether to role switch. For example, the second device may request to take over as the primary device. In other examples, such as where the devices both perform the comparison, the device with the greater signal strength may automatically take on the role of primary device. In some examples, the determination of which device will serve as primary is based on additional factors. For example, such other factors may include battery life, time required to perform the role switch, or any of a variety of other factors.

According to some examples, if it is decided to perform a role switch, some or all of the connection parameters programmed into the secondary device may be used to facilitate the role switch. For example, having the connection parameters may enable some steps of role switch to be skipped.

Figure 6:
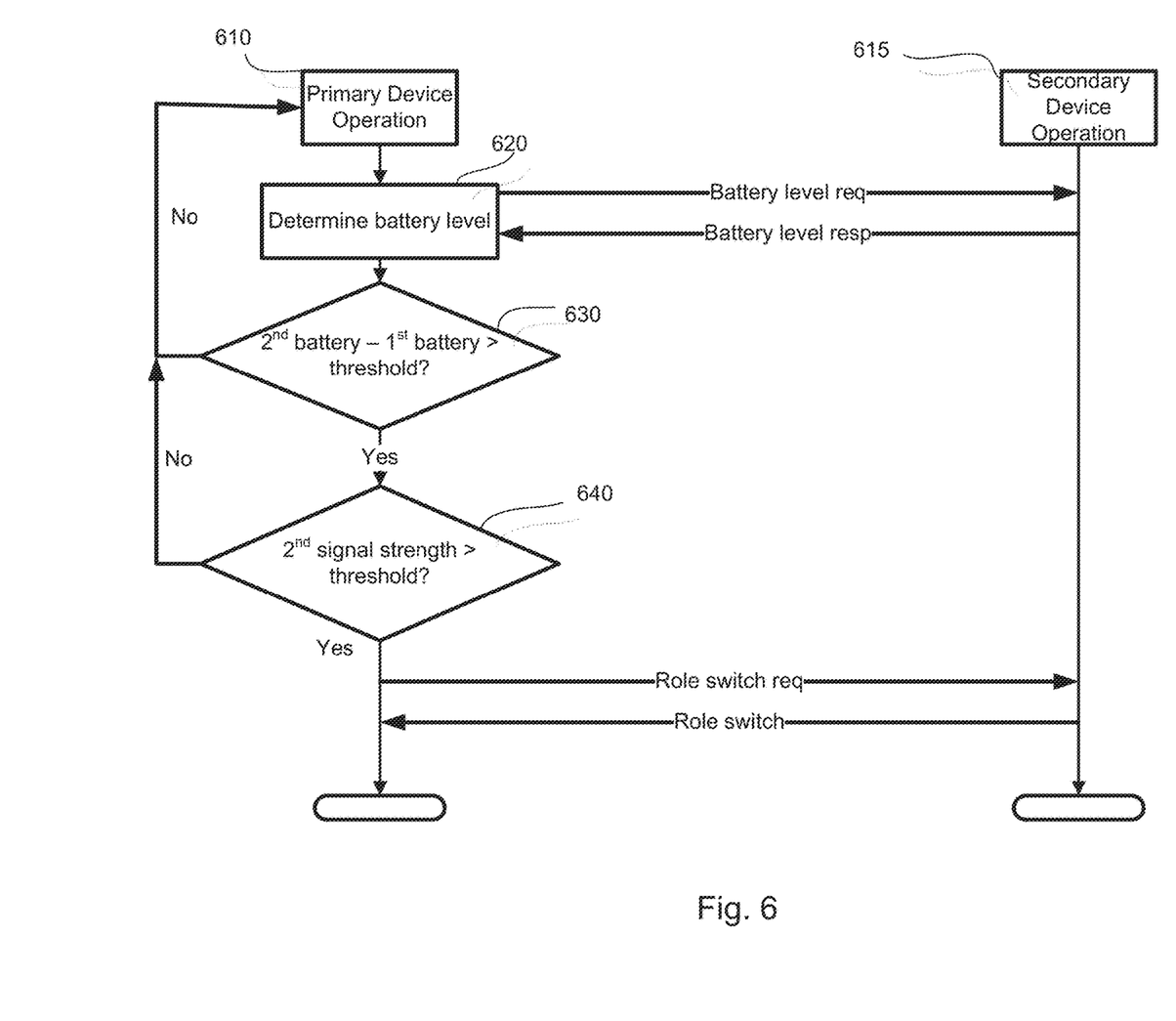
FIG. 6 is a flow diagram illustrating another example method according to aspects of the disclosure.

FIG. 6 is another example diagram illustrating a method 600 for determining whether to switch roles between paired devices. In block 610, the primary device operates in a primary or master mode, in which is receive packets from a host and relays the packets to the secondary device that is operating in the secondary or slave mode (block 615).

In block 620, the primary device determines its battery level and a battery level of the secondary device. For example, the primary device may send a request to the secondary device for its battery level, and the secondary device provides an indication of its battery level to the primary device in response. The indication may be, for example, a percentage of battery life left in the secondary device, an estimation of how much longer the battery can power the secondary device, or any other indication.

In block 630, the primary device compares its battery level to the secondary device battery level. For example, the primary device may determine whether the battery level of the secondary device is greater than the primary device battery level by a threshold amount. If the second device battery level is lower, equal to, or even just slightly higher than the primary device battery level, it may not be beneficial to switch roles. Accordingly, the primary device would continue operating in the primary/master role. However, if the secondary battery level is significantly higher than the primary battery level, the method continues to block 640.

In block 640, the primary device may consider additional criteria. For example, as shown the primary device determines whether a signal strength of a connection between the secondary device and the host is above a predefined threshold. If the secondary device does not satisfy the additional criteria, the primary device may continue to operate in the primary/master mode. If it does meet such additional criteria, however, the devices may switch roles.

Figure 7:
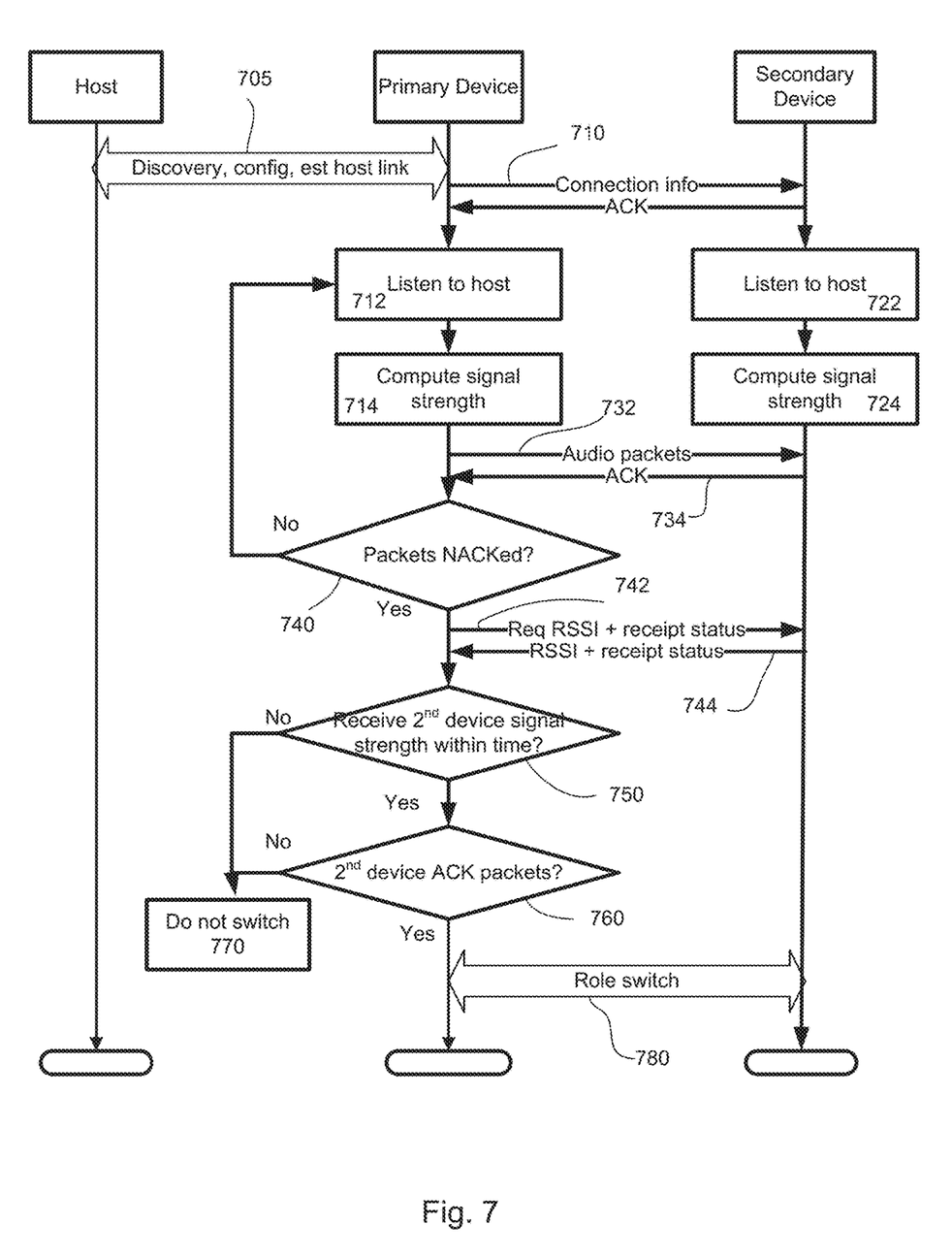
FIG. 7 is a flow diagram illustrating another example method according to aspects of the disclosure.

FIG. 7 illustrates an example of determining whether to perform role switch based on which device has the active microphone. Each of the first device and the second device have a microphone, with only one of the microphones being "active" at a given time. The active microphone may capture the user's voice and transmit it to the host device. When the primary device has the active microphone, but signal strength is better on the secondary device, it may be determined to perform a role switch to let the secondary device become primary. When the secondary device becomes the primary, it will take over the active microphone, and better signal quality can be enjoyed.

At 705, the host establishes a connection with the primary device. For example, the host and primary devices may negotiate ACL link setup and codec. At 710, the primary device send connection parameters to the secondary device, such as described above in connection with FIG. 5, for determining signal quality metrics between the secondary device and the host. Both the primary device and secondary device listen to the host (712, 722) and compute a signal strength (714, 724) based on the listening. For example, the signal strength may be an average RSSI over a predetermined period of time.

The primary device relays audio packets received from the host to the secondary device (732), and the secondary device acknowledges the received packets (734). However, in some instances the primary device may not receive an acknowledgement, such as if the secondary device does not receive the audio packet. At block 740, the primary device determines whether a predetermined number of packets were not acknowledged. In some instances, the primary device may attempt retransmission, and determine whether the predetermined number of packets were still not acknowledged. If so, the primary device requests signal strength and packet receiving status (742) from the secondary device, and the secondary devices responds with the requested information (744). If not, and the packets are being acknowledged as they should be, the primary device just keeps listening to the host and relaying packets until the packets are not being acknowledged.

At block 750, the primary device determines whether the secondary device provided the requested signal strength information within a predetermined period of time. For example, if the information is not received within 5 ms, 100 ms, or any other predefined duration of time, it may be determined that the bad connection is between the primary device and the secondary device, and therefore role switch would not improve packet drop. Accordingly, the devices would not role switch.

If the information is received within the predetermined period of time in block 750, the primary device may determine in block 760 whether the secondary device has acknowledged at least one packet correctly. In some examples, it may further determine whether the secondary device has better signal quality in its connection to the host than the primary device. Based on one or both of such determinations, the devices may decide to role switch. For example, if the secondary device has not correctly acknowledged at least one packet, or if the signal quality between the second device and the host is not better that the signal quality between the primary device and the host, the devices may decide not to role switch (770). However, if one or both factors are improved, then the devices may role switch (780).

Figure 8:
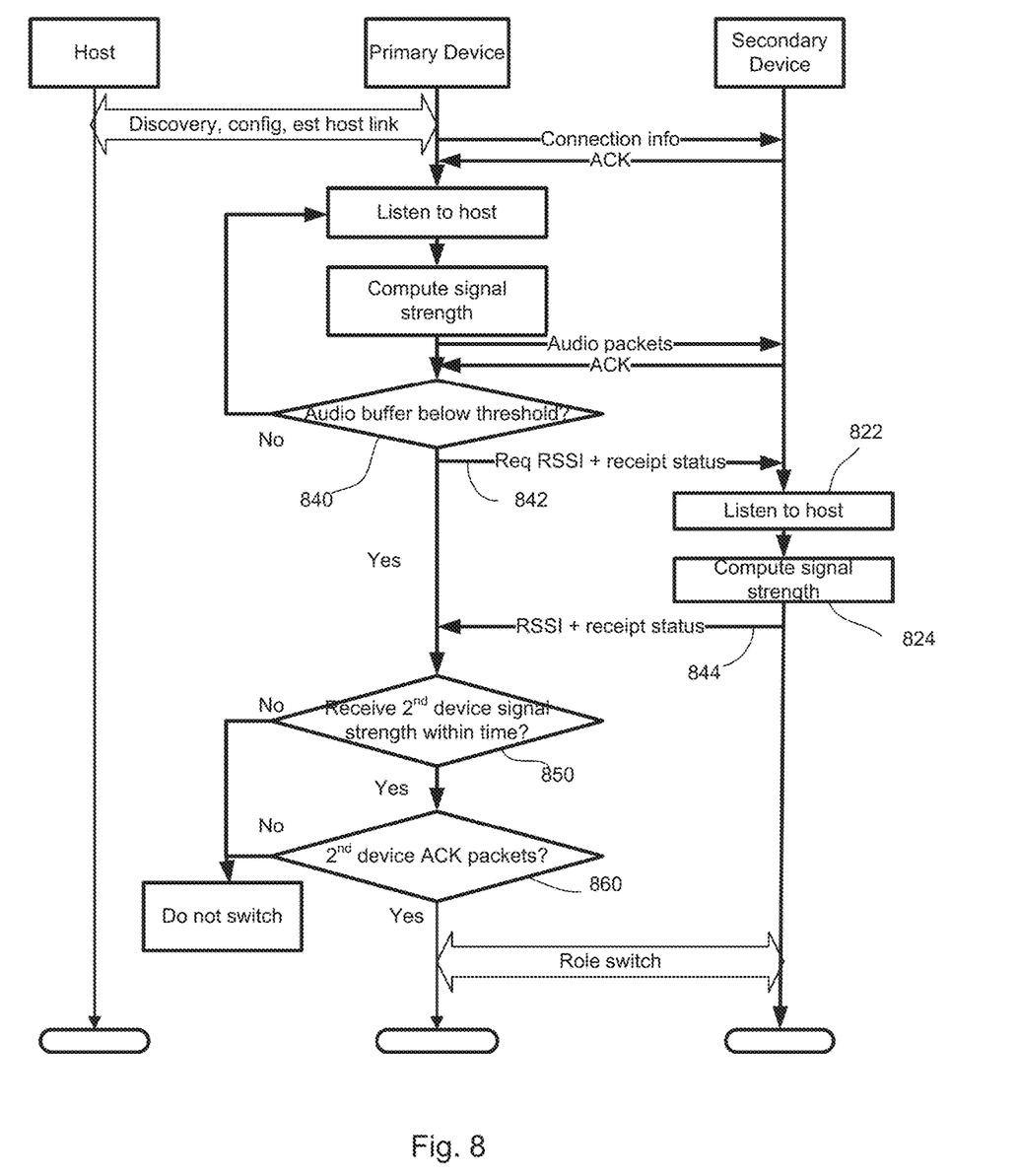
FIG. 8 is a flow diagram illustrating another example method according to aspects of the disclosure.

FIG. 8 illustrates an example method of determining whether to perform role switch based on changes in channel conditions. Factors such as motion, device orientation, physical characteristics of the device such as better antenna, temperature of each device, etc. may affect RF performance. The impact can be determined by measuring RSSI. When the primary device is in poor channel condition while secondary device is in good channel condition relative to the host, it may be better to switch roles such that the secondary device can maintain a good connection to the host and continue to receive audio content. Jitter buffer fullness may be monitored to determine the change in channel conditions. The role switch may be performed between the devices only and be transparent to the host.

The primary device may establish a connection with the host and provide connection parameters to the secondary device, similar to the method of FIG. 7. Further, the primary device may listen to the host, compute signal quality, and send audio packets to the secondary device and receive acknowledgements, also similar to FIG. 7.

In block 840, the primary device determines whether its audio buffer falls below a predetermined threshold. If so, it may be an indication that the primary bud is not receiving all audio content being provided by the host. For example, referring back to FIG. 1B, an audio packet first arrives in master device jitter buffer 111. The master device will also send the audio packet to slave jitter buffer 121. After accumulated packets in the jitter buffers surpass a predefined watermark, the decoders from both master and slave decoders 112, 122 start to get the packet from jitter buffer 111 and slave buffer 121, decode them and send to the speaker 116, 126 on both sides to play. If a channel condition of host communication link 152 between the host and master device 110 becomes worse, the master jitter buffer 111 will be quickly drained.

Returning to FIG. 8, when the primary device determines that its audio buffer is below the predetermined threshold, the primary device requests signal strength information and packet receipt status from the secondary device (842). In other examples, the secondary device may monitor its audio buffer levels, and reports its signal strength information to the primary device when the audio buffer levels fall below a predefined threshold.

The secondary device listens to the host (822) and computes the requested signal strength information (824) based on listening to the host. The secondary device provides the requested information (844) to the primary device.

In block 850, the primary device determines if the signal was received with a predetermined period of time, and in block 860 it determines whether the second device acknowledged at least one successful packet, similar to blocks 750, 760 of FIG. 7. Based on such determinations, the devices may determine whether or not to perform role switch.

The foregoing systems and methods are advantageous in that they provide increased information to paired devices for determining whether to perform role switch, without a significant consumption of power or other resources. In this regard, the devices can perform role switch at optimal times, such as when it would improve signal strength and also be seamless in that there is no audio glitch or other interruption noticeable to the user. As such, battery life and usage time of the devices may be extended, and an improved audio experience is provided.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for triggering role switch between first and second paired wireless devices, wherein the first device is operating in a first mode and the second device is operating in a second mode, the method comprising:
   detecting, by the first device, one or more conditions relative to the first device;
   sending, by the first device, connection parameters to the second device, the connection parameters providing information allowing for the second device to listen to communications between the first device and a host;
   receiving, by the first device, the one or more conditions relative to the second device as detected by the second device based on listening to the communications between the first device and the host;

comparing, by one or more processors of the first device, the detected one or more conditions relative to the first device with the one or more conditions relative to the second device;

determining, based on the comparison, whether to switch roles between the first device and the second device; and switching roles between the first device and the second device.

2. The method of claim 1, wherein the first mode is a primary mode, wherein the first device directly communicates with a host device, and the second mode is a secondary mode, wherein the second device indirectly communicates with the host device through the first device.

3. The method of claim 1, wherein the first mode is a master mode and the second mode is a slave mode.

4. The method of claim 1, wherein determining whether to switch roles comprises determining that the conditions relative to the second device are better than the conditions relative to the first device to at least a predetermined degree.

5. The method of claim 1, further comprising:
communicating, by the first device, with the host device, the communicating including one or more transmissions of packets;
wherein the one or more conditions comprise signal quality metrics.

6. The method of claim 5, wherein the signal quality metrics comprise at least one of received signal strength indicator or average signal strength.

7. The method of claim 1, wherein on the one or more conditions comprise battery life of at least one of the first device or the second device.

8. The method of claim 1, further comprising:
determining a projected time for the role switch to occur;
wherein determining whether to switch roles is further based on the projected time.

9. The method of claim 1, further comprising:
monitoring, by the first device, audio buffer levels of the first device;
detecting, by the first device, when the audio buffer levels of the first device drop below a predetermined threshold; and
requesting the one or more conditions relative to the second device as detected by the second device in response to the detecting.

10. The method of claim 1, further comprising:
monitoring, by the first device, acknowledgements from the second device for packets relayed from the first device to the second device;
detecting, by the first device, when a predetermined number of packets are not acknowledged; and
requesting the one or more conditions relative to the second device as detected by the second device in response to the detecting.

11. A system, comprising:
a first device adapted to operate in a primary role wherein the first device wirelessly couples to a host device; and
a second device adapted to operate in a secondary role wherein the second device wirelessly couples with the first device and communicates with the host device through the first device;

wherein the first device comprises one or more processors configured to:
communicate connection parameters to the second device for a connection between the first device and the host; and
determine first signal quality metrics for a host communication link between the first device and the host;
wherein the second device comprises one or more processors configured to:
listen to communications between the first device and the host using the connection parameters; and
determine second signal quality metrics for a potential connection between the second device and the host device based on the communications; and
wherein at least one of the first device or the second device is further configured to:
compare the first signal quality metrics with the second signal quality metrics; and
determine whether to switch roles based on at the least the comparison.

12. The system of claim 11, wherein the primary device and the second device are audio playback devices.

13. The system of claim 12, wherein the primary device and the second device are a pair of earbuds.

14. The system of claim 11, wherein the first device is adapted to detect one or more conditions, wherein detection of at least one of such conditions triggers a determination whether to compare the first signal quality metrics with the second signal quality metrics.

15. The system of claim 14, wherein the one or more conditions includes at least one of battery level, audio buffer level, or unsuccessful relay of packets.

16. A method for determining, by a secondary device, whether to switch roles with a paired primary device, the method comprising:
receiving connection parameters for a connection between the primary device and a host;
listening for communications between the primary device and the host using the received connection parameters;
determining secondary signal quality metrics for a potential connection between the secondary device and the host based on the communications;
receiving, from the primary device, primary signal quality measurements for a connection between the primary device and the host based on the communications; and
determining, based on the secondary signal quality measurements and the primary signal quality measurements, whether to switch roles with the primary device.

17. The method of claim 16, wherein determining the signal quality metrics comprises pretending that the secondary device has an actual connection to the host.

18. The method of claim 16, wherein determining the signal quality metrics comprises reviewing a packet header, and wherein signal strength is determined based on only the packet header.

19. The method of claim 16, wherein the secondary device disables reception after determining the signal strength.

20. The method of claim 16, wherein the listening for the communications comprises waking up at predetermined intervals to listen to the host.

* * * * *